Nov. 8, 1960 W. C. BUHLER 2,959,385
STRESSED SKIN PARACHUTE
Filed June 25, 1957
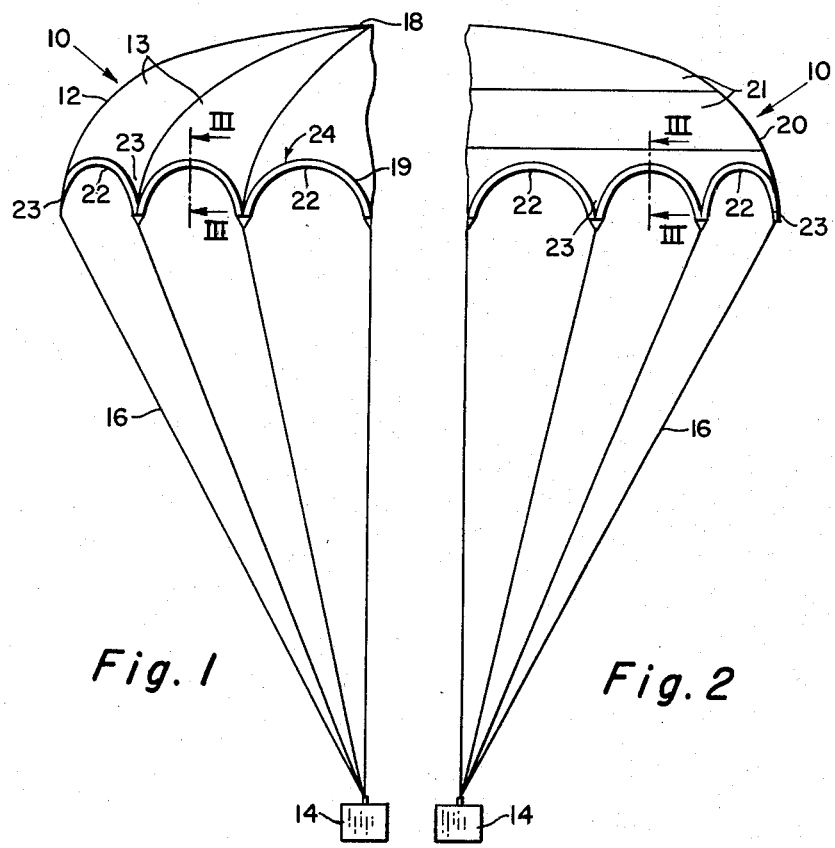
*Fig. 1*
*Fig. 2*
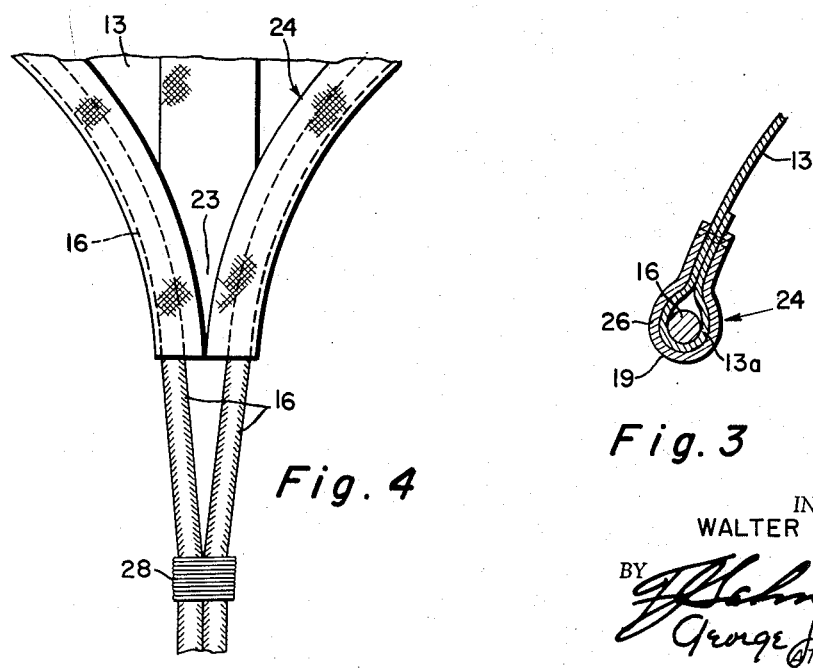
*Fig. 4*
*Fig. 3*
INVENTOR.
WALTER C. BUHLER United States Patent Office 2,959,385
Patented Nov. 8, 1960

2,959,385

STRESSED SKIN PARACHUTE

Walter C. Buhler, Reseda, Calif., assignor to the United States of America as represented by the Secretary of the Navy Filed June 25, 1957, Ser. No. 668,002

1 Claim. (Cl. 244—145)

(Granted under Title 35, U.S. Code (1952), sec. 266)

The invention described herein may be manufactured and used by or for the Government of the United States of America for governmental purposes without the payment of any royalties thereon or thereof.

This invention relates to parachutes and more particularly to parachutes wherein the entire hem or periphery of the canopy is uniformly stressed by the load bearing suspension line, enabling the canopy to be constructed of low shear strength material.

One of the most important considerations in parachute design is to obtain a canopy devoid of localized or unequal strains at the time of greatest stress, that is, when the parachute is first opened during descent. This factor is of prime importance when the parachute canopy is constructed of a low porosity material such as plastic film or paper, which has good tensile strength characteristics, but tears readily when subjected to a shear force.

It has been found desirable for very low altitude parachute drops to use a canopy material having low air permeability, such as plastic film and sheet paper, in order to rapidly decelerate the rate of descent. However, an inherent characteristic of these materials is that while they can withstand relatively high tensile forces, they readily tear when subjected to shear.

While prior art parachutes have been designed to withstand high shock forces, they do not uniformly distribute these forces between the canopy and the load suspension lines to enable use of the aforementioned materials having low shear strength.

A typical example is illustrated in Patent No. 2,505,954 wherein the straight hem of the parachute canopy is formed with a continuous channel lying in a common plane through which is threaded a wire ring. The channel is recessed at spaced points around the periphery to bare the wire ring to which is attached individual load suspension lines. It is apparent that the rim of the parachute will be unevenly stressed by the load suspension lines, with the greatest stress occurring at the hem channel, adjacent each recess, accompanied by a puckering of material. The unequal stress created is sufficient to rip parachute canopies made of material highly resistant to shear forces as well as materials, such as paper and plastic film, which are easily ripped.

According to the instant invention the periphery of the parachute canopy is provided with a series of concave tubes, preferably approximating a catenary, through which is threaded a line for uniformly supporting the load. In the preferred embodiment, a hem edge of the canopy is formed of a series of concave or scalloped edges, and the tubes have a corresponding curvature being coterminous therewith. The diametrically deposed ends of each tube are open, the open ends of each tube lying adjacent the open ends of adjacent tubes forming apices in the canopy between adjacent scalloped portions. An inverted U-shaped load suspension line is freely threaded through each tube, the center portion being freely housed in the tube, and the leg portions converging downwardly for attachment to the load. Thus, each concave canopy portion is provided with a pair of load suspension lines, the load lines of adjacent concave portions emerging from their respective tubes in close proximity and joined together immediately below the apexes of the canopy formed between adjacent tubes. By this construction, the entire periphery of the canopy is uniformly stressed in tension at an infinite number of points around the periphery of the canopy, minimizing any shear forces on the canopy.

A principal object of this invention is to provide a parachute in which the canopy is uniformly stressed in tension.

Another object is to provide such a parachute canopy which can be constructed of a material having low shear strength characteristics.

Other objects and many of the attendant advantages of this invention will be readily appreciated as the same becomes better understood by reference to the following detailed description when considered in connection with the accompanying drawings wherein:

Fig. 1 is a somewhat diagrammatic partial elevation of a radial gore-type parachute employing this invention;

Fig. 2 is a somewhat diagrammatic partial elevation of a parallel ribbon-type parachute employing this invention;

Fig. 3 is an enlarged cross sectional view for receiving a shroud line of the canopy hem edge showing the tubular construction taken along line III—III of Fig. 1; and Fig. 4 is an enlarged view of the canopy hem where adjacent concave portions intersect to form an apex in the parachute canopy.

Referring now to the drawings where like reference characters designate corresponding parts throughout the views, there is shown in Figs. 1 and 2 a parachute 10 comprising a canopy 12 from which is suspended a load 14 by shroud or load suspension lines 16. In Fig. 1 canopy 12 is formed of a plurality of interconnected gores 13 extending radially from peak portion 18 to a hem portion 19. In Fig. 2, parachute 10 comprises canopy 20 constructed of a plurality of interconnected parallel strips 21. The aforementioned description of the canopies are of conventional designs. While the invention can be practiced on parachute canopies made of conventional fabric materials, it is particularly suitable for canopies made of paper and plastic materials, etc., having low shear strength.

The specific improvement of this invention resides in forming the periphery of hem portion 19 of the canopies with a series of recessed concave curved portions 22, or inverted scalloped portions, each curved portion approximating a catenary or being parabolic or circular in form. In the preferred embodiment, the ends of each curved portion intersect or are tangent to the ends of next adjacent curved portions creating therebetween apices 23 in the canopy spaced around the periphery thereof.

As shown in Fig. 3, the hem edge of each curved portion 22 terminates in a tube generally indicated at 24, consisting of a looped end 13a of the canopy suitably reinforced by a channel strip 26 sewn or otherwise secured thereto. Each tube 24 is open at the diametrically opposite ends, one corresponding end of each tube lying substantial adjacent the opposite tube end of the next adjacent curved portion at the apex of the canopy therebetween, or in other words, the right and left ends of adjacent tubes are in juxtaposition.

An individual shroud line 16 is provided for each curved portion and which extends freely through a corresponding tube. The central portion of each shroud assumes an inverted U-shape conforming to the curvature of the tube, the two leg portions of the shroud line extending downward to load 14 and attached thereto in a conventional manner. The opposing leg portions emerging from adjacent tube ends are suitably joined together at 28, see Fig. 4, immediately below the apex, by stitching, serving or spliced by the so-called "Chinese finger lock" construction. The load suspension lines can be stitched to the tubes adjacent the open ends to retard any tendency of the tubes to climb up along the lines. By the foregoing canopy construction, the load forces applied to the canopy are all in tension being uniformly distributed along the curved tubes at an infinite number of points to produce a uniform stress distribution. Since the canopy material is subjected to relatively no shear components of force, materials having good tension characteristics but weak in shear can now be used where the need of low air permeability material is a prerequisite.

A parachute constructed according to this invention ensures a uniform distribution of force over the entire periphery of the parachute, eliminating the need for weighty truss-like reinforcements used in conventional parachutes and enabling plastic and paper sheet material to be used. A uniformly stressed canopy as herein disclosed also achieves greater parachute stability.

Obviously many modifications and variations of the present invention are possible in the light of the above teachings. It is therefore to be understood that within the scope of the appended claim the invention may be practiced otherwise than as specifically described.

I claim:

A uniformly stressed parachute comprising a canopy made of low air permeability material having a lower hem edge constructed with a series of concave curved portions lying in adjacent relation along the periphery thereof, the peripheral edge of each curved section being formed of an open ended tube, the open ends of adjacent tubes being in abutting relation forming an apex, a U-shaped shroud line for each curved portion, each shroud line having an intermediate portion loosely housed in a corresponding tube and having depending leg portions adapted to be secured to a load to be supported, the leg portions emerging from adjacent tube ends being secured together at a point immediately below adjacent the apex formed in the canopy by adjacent curved portions whereby a uniform distribution of force can be transferred from the lines around the entire periphery of the canopy.

References Cited in the file of this patent

UNITED STATES PATENTS

| | | |
|---|---|---|
| 2,309,107 | Giroux | Jan. 26, 1943 |
| 2,349,833 | Robinson | May 30, 1944 |
| 2,505,954 | Frieder et al. | May 2, 1950 |
| 2,745,615 | Fogal | May 15, 1956 |

FOREIGN PATENTS

| | | |
|---|---|---|
| 457,683 | Italy | May 29, 1950 |
| 617,903 | France | Nov. 30, 1926 |
| 829,496 | France | Apr. 5, 1938 |